T. C. DOBBINS.
RESILIENT WHEEL.
APPLICATION FILED MAR. 27, 1915.
1,147,621.
Patented July 20, 1915.
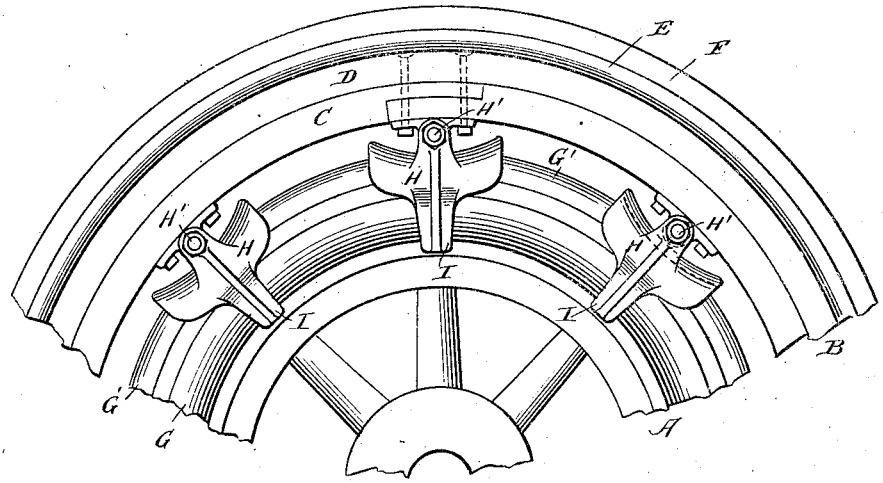
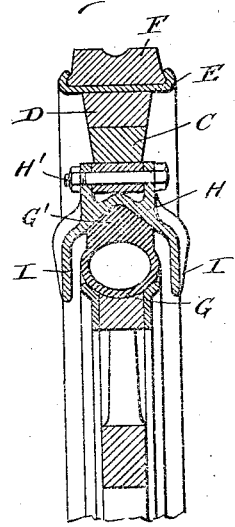
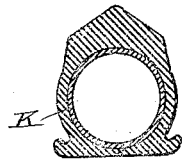
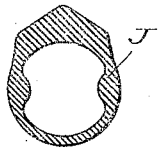
Inventor
Timothy C. Dobbins
By Wallace Green
Attorney

UNITED STATES PATENT OFFICE.

TIMOTHY C. DOBBINS, OF HUNTINGTON PARK, CALIFORNIA.

RESILIENT WHEEL.

1,147,621.  Specification of Letters Patent.  Patented July 20, 1915.

Application filed March 27, 1915. Serial No. 17,339.

*To all whom it may concern:*

Be it known that I, TIMOTHY C. DOBBINS, a citizen of the United States, residing at Huntington Park, in the county of Los Angeles and State of California, have invented certain new and useful Improvements in Resilient Wheels, of which the following is a specification, reference being had therein to the accompanying drawing.

This invention relates to resilient wheels of the type in which the principal resilient devices lie within the circle of an outer rim which moves vertically, under variations in load thrust, with respect to the central portion of the wheel.

Its object is to combine simplicity, efficiency, and durability with practically perfect safety under all conditions, and particularly to guard against the detachment of the rim from the central portion of the wheel under stress transverse to the wheel's plane.

In the accompanying drawings, Figure 1 is a side elevation of a portion of a wheel involving my devices. Fig. 2 is a radial section of the outer portion of the same wheel. Figs. 3 and 4 are cross sections of slightly modified tubes or resilient members used when desired, with the other devices shown in Figs. 1 and 2.

In these figures, A represents the felly member of a heavy wheel and B an encircling rim having in this illustrative example, annular concentric wood members C, D, a tread receiving member E, and a tread member F held in the member E and preferably of rubber. Between the felly and rim are interposed devices for securing resiliency and preventing the rim from leaving the plane of the wheel. These devices are of any suitable character and are here shown as an endless pneumatic tube G and a series of shoes H pivoted to the rim to rest against the tube and swing in its plane. Each shoe is provided on each face of the wheel with lugs or rigid fingers I extending inwardly and always overlapping the felly so that the rim is not entirely dependent upon the tube for holding it in place upon the wheel center. Preferably these lugs are normally at a little distance from the tire and rim so that they rub against neither, ordinarily, and come into contact only when the tube is collapsed or when great transverse force is exerted. The inner face of each shoe is preferably V-like in cross section and the tube has upon its outer side a heavy projecting portion G' of corresponding shape so that it fits the shoes and under ordinary conditions, holds them and the rim accurately in position. The shoes rock freely upon their pivots H', and while they preferably indent the tube at all times, they are so formed that rocking rapidly increases their compressive action on the tube. In this compression substantially all the force of load-thrust is absorbed there being no material strains of a different kind upon any part of the tube or analogous resilient member. Since under load at least half the shoes tend to compress the tube, the strain is widely distributed and the inclosed air although rapidly lessened in volume allows enough movement to give the wheel unusual resiliency. The compression of the tube tends to bend its sides between the shoes and the felly, and the tube is sometimes thickened at this point, as shown at J, Fig. 4. Obviously, the tube may be a single tube or may like a clencher tire, involve an inner tube K, as shown in Fig. 3. Under ordinary working conditions, the wedge shape of the tube wall and shoes holds the shoes and rim accurately in place and prevents any slipping of the contact surfaces, even under strong side thrusts, so that the slight wear occurring when the tube is circular in cross section is almost wholly avoided. Whatever the form of the tube, however, there is a possibility that a rim which, with all its attachments, is not positively connected with the central portion of the wheel may become detached, for example by the bursting of the tube at high speed and while rounding a curve, and that serious results may follow. This evil is guarded against by the lugs I, the construction being such that were the tube collapsed or even removed, the wheel center would move downward slightly with respect to the rim but would be held in approximately its proper plane by the many lugs engaging the felly. Thus an accident of this kind would be far less dangerous than the bursting of a tire of an ordinary wheel, under like conditions.

The construction may be greatly varied without passing the proper limits of the invention, it being a simple matter to embody the same inventive ideas in many ways.

What I claim is:

1. The combination with a wheel center member and a rigid concentric rim member encircling and spaced from the center member, of a highly compressible resilient device located between said members and borne by one of them, and a series of projections mounted on the other member to swing freely in the plane of the wheel while pressing the resilient device, adapted to vary in compressive action while swinging, and provided with rigid extensions overlapping the member bearing the resilient devices and aiding in keeping the two members in the same plane.

2. The combination with a wheel center member and a rigid concentric rim member encircling the center member, of spacing devices interposed between said members and consisting of a resilient device carried by one member and devices mounted on the other member to swing in the plane of the wheel while engaging the resilient device, provided, on each face of the wheel, with rigid extensions to overlap the companion member and maintain the two members in the same plane, said swinging devices being adapted to increasingly compress the resilient device in swinging from normal position.

3. The combination with a peripherally resilient wheel center member, of a larger concentric rim member, compressing shoes resting against the resilient periphery of the center member, and pivoted to the rim member to rock in its plane thereby varying the compressive action, said shoes being provided with rigid lugs extending on each face of the wheel alongside and unconnected with the wheel center member.

4. The combination with a wheel and its felly, of an annular resilient member encircling the felly and having its outer side wedge-like in cross section, a rim encircling and at some distance from said resilient member, and a series of spaced shoes fitting saddle-like over the resilient member, pivoted to the rim to rock in its plane and provided with rigid fingers projecting inwardly up on each face of the wheel and overlapping the felly.

5. The combination with a wheel center member and a rigid concentric rim member spaced therefrom, of a resilient structure having its working face wedge-like in cross section, and a series of devices mounted on the other member to swing in the plane of the wheel while fitting and pressing said working face.

6. In a resilient wheel, a resilient tire having its working face wedge-shaped in cross section combined with tire pressing devices of corresponding cross section in saddle-like engagement with said face and pressing radially thereon.

7. The combination with a wheel center member, of a larger concentric rim member spaced from the center member, shoes mounted on one of said members to swing in the plane of the wheel, a resilient body pressed by said shoes against the other of said members with force varying as the shoes swing, and rigid projections extending from said shoes, on each face of the wheel, alongside the member against which the resilient body is pressed, to aid in keeping the rim member in the plane of the center member.

In testimony whereof I affix my signature in presence of two witnesses.

TIMOTHY C. DOBBINS.

Witnesses:
J. F. CLARK,
MARY V. ROBERTSON.

Copies of this patent may be obtained for five cents each, by addressing the "Commissioner of Patents, Washington, D. C."